(12) United States Patent
Henry et al.

(10) Patent No.: US 8,375,078 B2
(45) Date of Patent: Feb. 12, 2013

(54) FAST FLOATING POINT RESULT FORWARDING USING NON-ARCHITECTED DATA FORMAT

(75) Inventors: G. Glenn Henry, Austin, TX (US); Terry Parks, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 455 days.

(21) Appl. No.: 12/820,578

(22) Filed: Jun. 22, 2010

(65) Prior Publication Data

US 2011/0060785 A1    Mar. 10, 2011

Related U.S. Application Data

(60) Provisional application No. 61/240,753, filed on Sep. 9, 2009.

(51) Int. Cl.
*G06F 7/38* (2006.01)

(52) U.S. Cl. ........................................... 708/495

(58) Field of Classification Search .................. 708/495, 708/204
See application file for complete search history.

(56) References Cited

U.S. PATENT DOCUMENTS

| | | | | |
|---|---|---|---|---|
| 5,687,106 | A * | 11/1997 | Schwarz et al. | 708/499 |
| 2007/0226288 | A1* | 9/2007 | Inagaki et al. | 708/501 |
| 2011/0060892 | A1 | 3/2011 | Henry et al. | |

* cited by examiner

*Primary Examiner* — Tan V. Mai
(74) *Attorney, Agent, or Firm* — E. Alan Davis; James W. Huffman

(57) ABSTRACT

A microprocessor having an instruction set architecture (ISA) that specifies at least one architected data format (ADF) for floating-point operands. The microprocessor includes a plurality of floating-point units, each comprising an arithmetic unit configured to receive non-ADF source operands and to perform a floating-point operation on the non-ADF source operands to generate a non-ADF result. The microprocessor also includes forwarding buses, configured to forward the non-ADF result generated by each arithmetic unit of the plurality of floating-point units to each of the plurality of floating-point units for selective use as one of the non-ADF source operands.

22 Claims, 4 Drawing Sheets

US 8,375,078 B2

FAST FLOATING POINT RESULT FORWARDING USING NON-ARCHITECTED DATA FORMAT

CROSS REFERENCE TO RELATED APPLICATION(S)

This application claims priority based on U.S. Provisional Application, Ser. No. 61/240,753, filed Sep. 9, 2009, entitled FAST FLOATING POINT RESULT FORWARDING USING NON-ARCHITECTED DATA FORMAT, which is hereby incorporated by reference in its entirety.

This application is related to U.S. Non-Provisional application Ser. No. 12/820,662, filed concurrently herewith, entitled SPECULATIVE FORWARDING OF NON-ARCHITECTED DATA FORMAT FLOATING POINT RESULTS, which is incorporated by reference herein in its entirety, and which is subject to an obligation of assignment to common assignee VIA Technologies, Inc.

FIELD OF THE INVENTION

The present invention relates in general to the field of pipelined microprocessor architectures, and particularly to the forwarding of floating-point results from one instruction to another.

BACKGROUND OF THE INVENTION

The x86 architecture specifies multiple data formats for floating point operands, namely, single-precision, double-precision, and extended double-precision. This implies that the floating point units have a different multiplier, adder, etc. for each architected data format. This is an inefficient use of space and power. So, to reduce the number of multipliers, adders, etc., the floating point units include a single multiplier, adder, etc. each capable of operating on operands that are in a single non-architected data format. The floating point units convert the received source operands from their architected data format to the non-architected data format, perform the operation on the non-architected data format operands to generate a result in the non-architected data format, and then convert the result back to the architected data format. The architected data format results are then forwarded to the floating point units as source operands, as illustrated by the conventional floating point units 112 shown in FIG. 4.

BRIEF SUMMARY OF INVENTION

In one aspect the present invention provides a microprocessor having an instruction set architecture (ISA) that specifies at least one architected data format (ADF) for floating-point operands. The microprocessor includes a plurality of floating-point units, each comprising an arithmetic unit configured to receive non-ADF source operands and to perform a floating-point operation on the non-ADF source operands to generate a non-ADF result. The microprocessor also includes forwarding buses, configured to forward the non-ADF result generated by each arithmetic unit of the plurality of floating-point units to each of the plurality of floating-point units for selective use as one of the non-ADF source operands. Each of the floating-point units includes a mux configured to receive the non-ADF results and to select one or more of the non-ADF results for provision as the non-ADF source operands to the floating-point unit.

In another aspect, the present invention provides a method for processing floating-point instructions in a microprocessor having first and second floating-point units each having an arithmetic unit, wherein the microprocessor has an instruction set architecture (ISA) that specifies at least one architected data format (ADF) for floating-point operands. The method includes the arithmetic unit of the first floating-point unit performing a floating-point operation on first and second non-ADF source operands to generate a first non-ADF result. The method also includes the arithmetic unit of the second floating-point unit performing a floating-point operation on third and fourth non-ADF source operands to generate a second non-ADF result. The method also includes the first floating-point unit forwarding the first non-ADF result to the second floating-point unit. The method also includes the second floating-point unit forwarding the second non-ADF result to the first floating-point unit. The method also includes the arithmetic unit of the first floating-point unit performing a floating-point operation on the second non-ADF result and a fifth non-ADF operand to generate a third non-ADF result. The method also includes the arithmetic unit of the second floating-point unit performing a floating-point operation on the first non-ADF result and a sixth non-ADF operand to generate a third non-ADF result. Each of the floating-point units includes a mux configured to receive the non-ADF results and to select one or more of the non-ADF results for provision as the non-ADF source operands to the floating-point unit.

In yet another aspect, the present invention provides a computer program product encoded in at least one computer readable medium for use with a computing device, the computer program product comprising computer readable program code embodied in said medium for specifying a microprocessor having an instruction set architecture (ISA) that specifies at least one architected data format (ADF) for floating-point operands. The computer readable program code includes first program code for specifying a plurality of floating-point units, each comprising an arithmetic unit configured to receive non-ADF source operands and to perform a floating-point operation on the non-ADF source operands to generate a non-ADF result. The computer readable program code also includes second program code for specifying forwarding buses, configured to forward the non-ADF result generated by each arithmetic unit of the plurality of floating-point units to each of the plurality of floating-point units for selective use as one of the non-ADF source operands. Each of the floating-point units includes a mux configured to receive the non-ADF results and to select one or more of the non-ADF results for provision as the non-ADF source operands to the floating-point unit.

DETAILED DESCRIPTION OF THE INVENTION

The forwarding of architected data format results described above with respect to FIG. 4, or more specifically the data format conversions performed, is time-wasteful in the sense that it adds additional latency in cases where the result-generating and result-consuming instructions are scheduled back-to-back for execution. To reduce latency, embodiments described herein include modified floating point units that forward the non-architected data format (NADF) result without converting to the architected data format (ADF) and are capable of receiving and operating directly on the NADF operands without converting them from the ADF to the NADF. This reduces the latency by removing the conversion time in and out of the floating point units from the critical path. The amount of latency reduced may be particularly significant when there is a sequence of back-to-back result-generating and result-consuming instructions such that the modified floating point units are able to forward the NADF results. In one embodiment, the NADF includes additional exponent bits beyond the number of exponent bits specified by the largest ADF. For example, in one embodiment the largest ADF is the 80-bit double-precision format, which includes a 15-bit exponent field, and the NADF includes a 17-bit exponent field to accommodate overflows and underflows.

Figure 1:
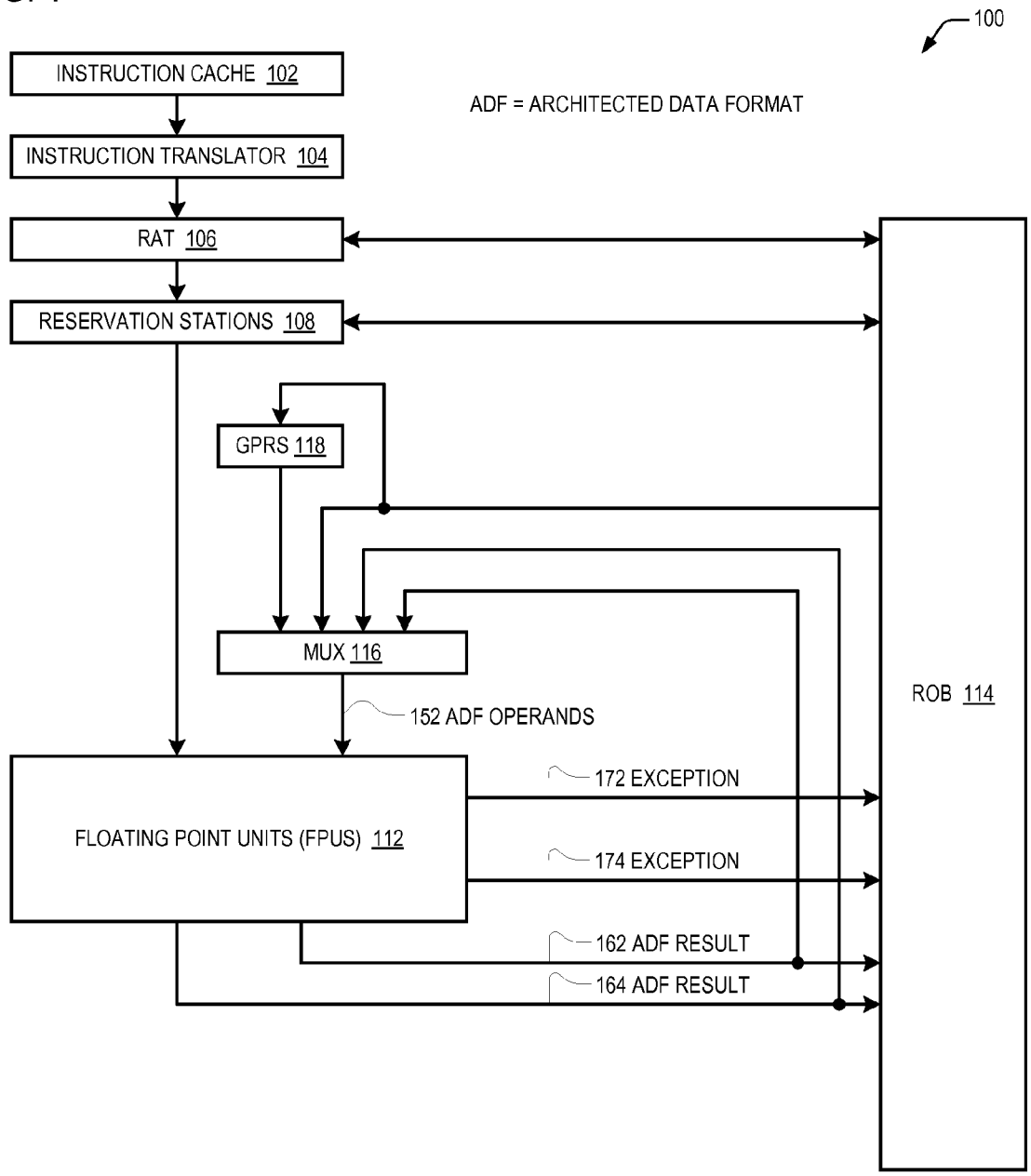
FIG. 1 is a block diagram illustrating a microprocessor that incorporates latency-reducing non-architectural data format result forwarding.

Referring now to FIG. 1, a block diagram illustrating a microprocessor 100 that incorporates the latency-reducing NADF result forwarding described above is shown. The microprocessor 100 includes a plurality of floating point units (FPU) 112. In one embodiment, the floating point units 112 include a first floating point unit 112A that includes a floating point multiplier 226 (see FIG. 2) that generates a first ADF result 162, and a second floating point unit 112B that includes a floating point adder 236 (see FIG. 2) that generates a second ADF result 164. The floating point units 112 receive ADF source operands 152 from a multiplexer 116 that receives ADF source operands from general purpose registers (GPRs) 118, from temporary registers of a reorder buffer (ROB) 114, and the ADF results 162/164 from the floating point units 112 themselves. Additionally, the floating point units 112 generate respective exception signals 172/174 to the ROB 114 to indicate that an instruction created an exception condition, such as an overflow or underflow, as described in more detail below.

In one embodiment, the microprocessor 100 is an x86 (also referred to as IA-32) architecture microprocessor 100; however, other microprocessor architectures may be employed. A microprocessor is an x86 architecture processor if it can correctly execute a majority of the application programs that are designed to be executed on an x86 microprocessor. An application program is correctly executed if its expected results are obtained. In particular, the microprocessor 100 executes instructions of the x86 instruction set and includes the x86 user-visible register set.

Figure 2:
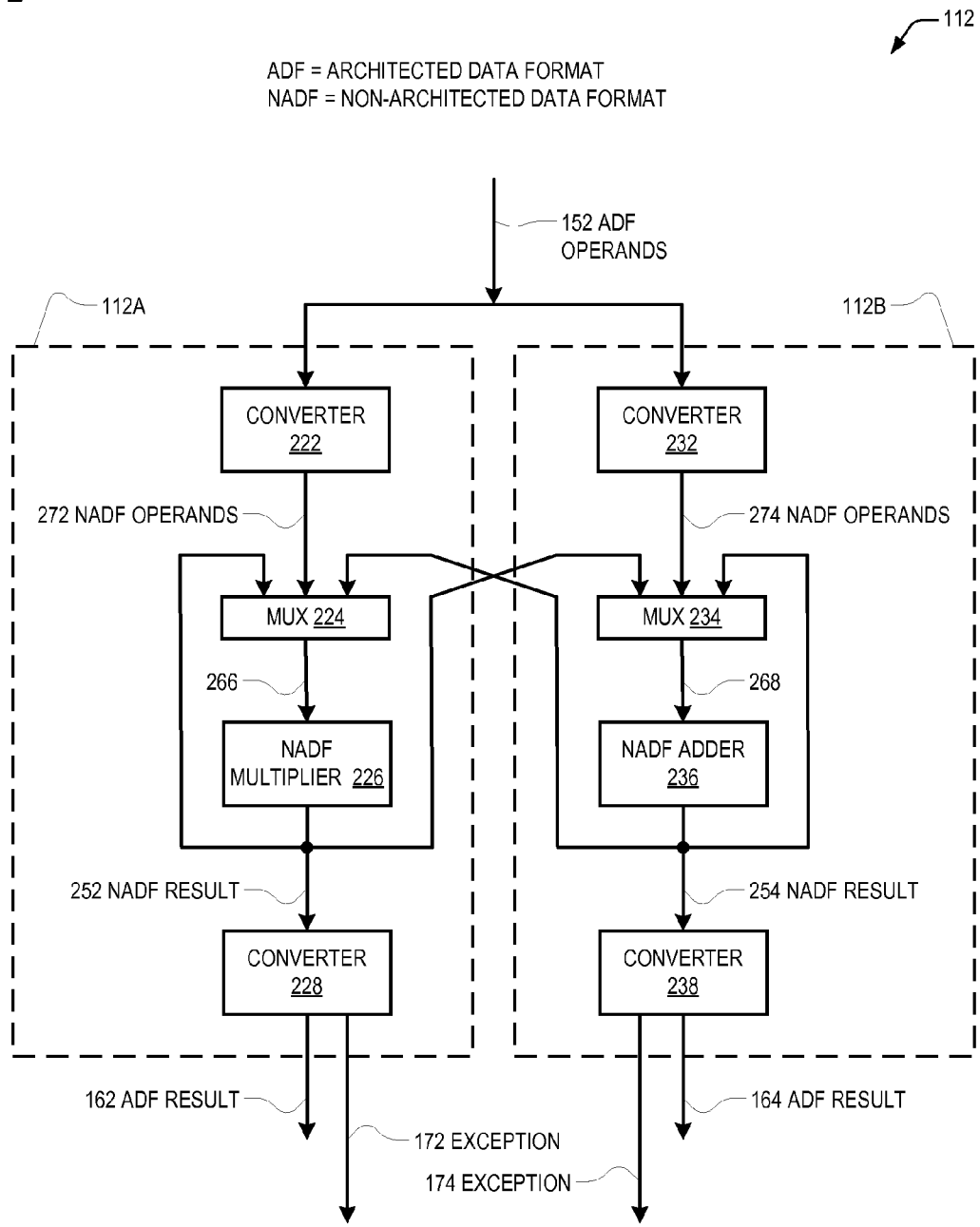
FIG. 2 is a block diagram illustrating in more detail the floating point units of FIG. 1.

Referring now to FIG. 2, a block diagram illustrating in more detail the floating point units 112 of FIG. 1 is shown. Floating point unit 112A includes a converter 222, coupled to a mux 224, coupled to a NADF multiplier 226, coupled to a second converter 228. Floating point unit 112B includes a converter 232, coupled to a mux 234, coupled to a NADF adder 236, coupled to a second converter 238.

The converter 222 converts the ADF operands 152 into NADF operands 272 that are provided to the mux 224. The mux 224 also receives a NADF result 252 forwarded from the NADF multiplier 226 and a NADF result 254 forwarded from the NADF adder 236. From its inputs, the mux 224 selects NADF operands 266 for provision to the NADF multiplier 226, which multiplies the operands 266 to generate the NADF result 252. The converter 228 converts the NADF result 252 to the ADF result 162 of FIG. 1. Additionally, the converter 228 generates an exception indicator 172 of FIG. 1 if it detects that the ADF result 162 created an exception condition, such as an underflow or overflow. That is, the NADF may have accommodated the result 252 without creating an underflow or overflow; however, the smaller ADF may not sufficiently accommodate the NADF result 252 such that the conversion from the NADF to the ADF creates an exception condition.

The converter 232 converts the ADF operands 152 into NADF operands 274 that are provided to the mux 234. The mux 234 also receives the NADF result 252 forwarded from the NADF multiplier 226 and the NADF result 254 forwarded from the NADF adder 236. From its inputs, the mux 234 selects NADF operands 268 for provision to the NADF adder 236, which adds the operands 268 to generate the NADF result 254. The converter 238 converts the NADF result 254 to the ADF result 164 of FIG. 1. Additionally, the converter 238 generates an exception indicator 174 of FIG. 1 if it detects that the ADF result 164 created an exception condition, such as an underflow or overflow.

Figure 4:
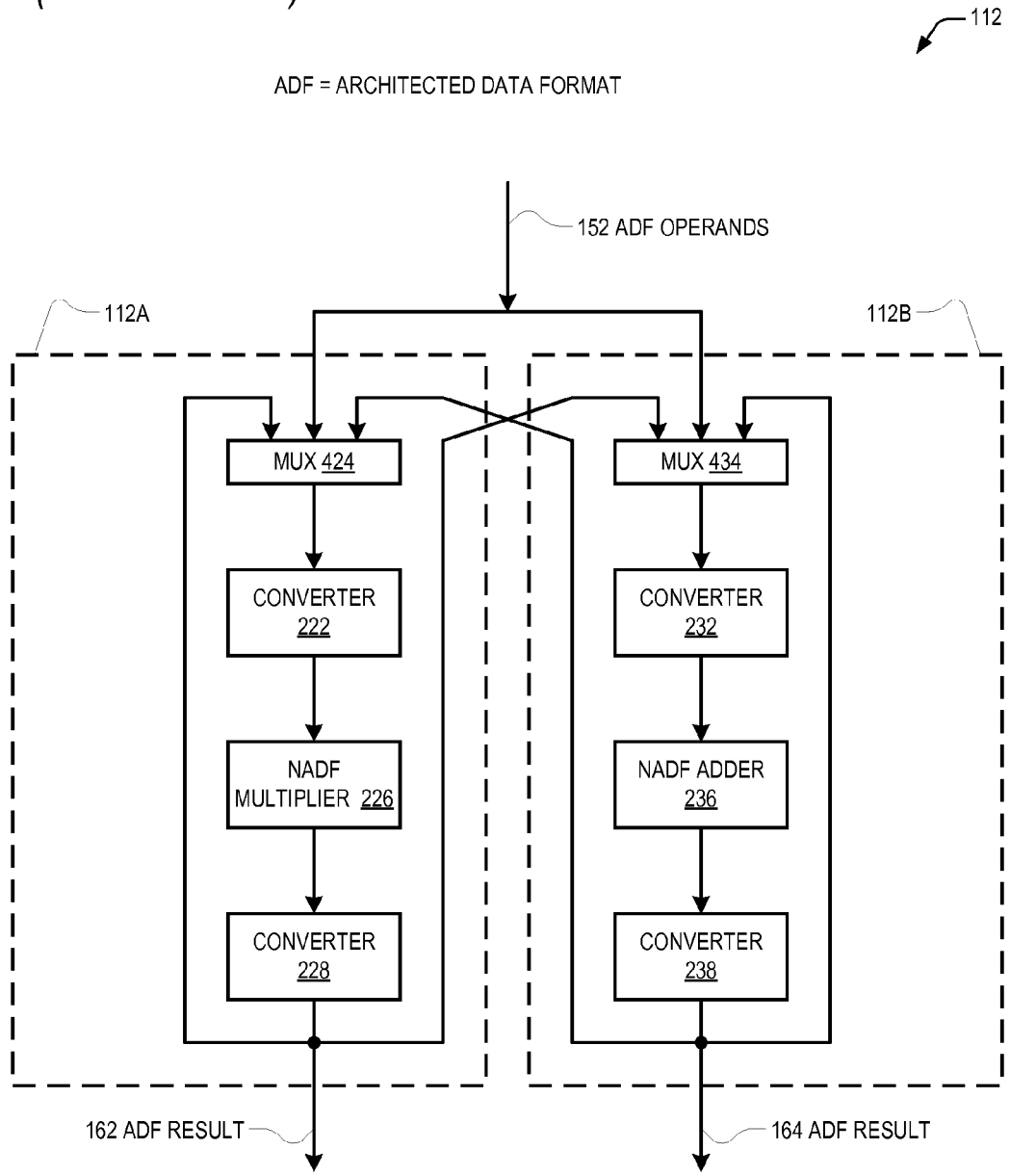
FIG. 4 is a block diagram illustrating related art floating point units that do not forward non-architectural data format results.

As may be observed by comparing FIGS. 2 and 4, the floating point units 112 of FIG. 2 advantageously potentially reduce instruction execution latency by directly forwarding to one another their NADF results 252/254. This is in contrast to the conventional floating point units 112 of FIG. 4, which incur the latency of converting the NADF results to ADF results, forwarding the converted ADF results, and then reconverting to NADF operands.

Floating point operations may generate exception conditions, such as overflow or underflow. A side-effect of the NADF is that some results that would overflow/underflow in the ADF would not do so in the NADF, e.g., because of the larger exponent, as discussed above. Consequently, the forwarding of the NADF results 252/254 is speculative because the programmer may not want the instruction that receives the forwarded NADF result 252/254 to execute with a value that would cause an exception when converted to ADF. Therefore, in parallel with the speculative forwarding of NADF results 252/254, the converters 228/238 also perform the conversion to ADF, and if the conversion yields an overflow/underflow, then they generate an exception 172/174 on the forwarding instruction and the microprocessor 100 kills the instruction that executed using the speculatively forwarded NADF result, as described in more detail with respect to FIG. 3.

Figure 3:
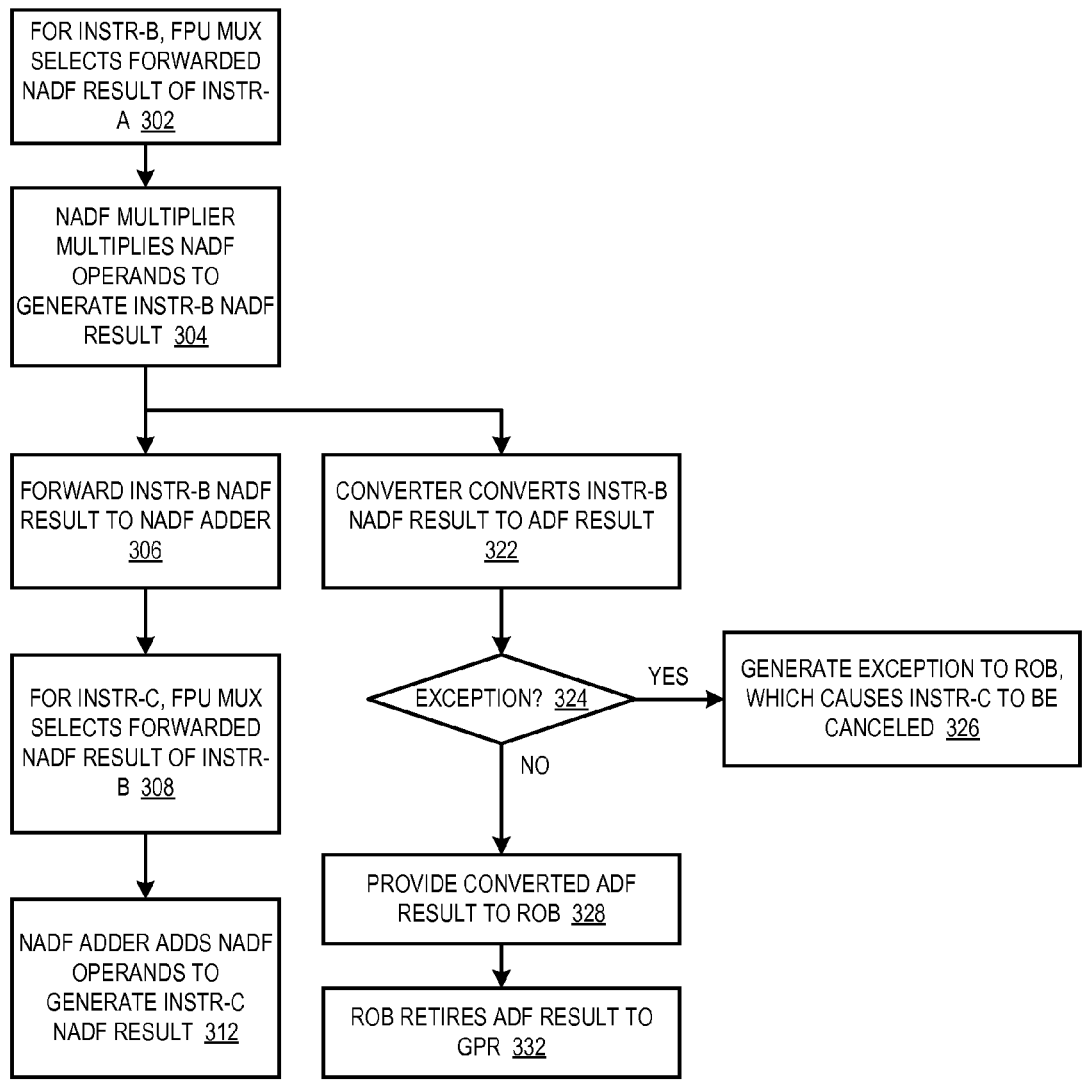
FIG. 3 is a flowchart illustrating an example of operation of the microprocessor of FIG. 1.

Referring now to FIG. 3, a flowchart illustrating an example of operation of the microprocessor 100 of FIG. 1 is shown. Flow begins at block 302.

At block 302, floating point unit 112A receives an instruction-B for execution. The mux 224 detects that one of the source operands is the NADF result 254 of a previous instruction-A that has been forwarded from the NADF adder 236 and accordingly selects the forwarded NADF result 254. The mux 224 may also select as the other operand the forwarded NADF result 252 from the NADF multiplier 226 or the converted NADF operands 272. Flow proceeds to block 304.

At block 304, the NADF multiplier 226 multiplies the NADF operands 266 to generate the NADF result 252 for instruction-B. Flow proceeds concurrently from block 304 to blocks 306 and 326.

At block 306, the forwarding buses forward the NADF result 252 of instruction-B to the NADF adder 236. Flow proceeds to block 308.

At block 308, floating point unit 112B receives an instruction-C for execution. The mux 234 detects that one of the source operands is the NADF result 252 of instruction-B that has been forwarded at block 306 from the NADF multiplier 226 and accordingly selects the forwarded NADF result 252. The mux 234 may also select as the other operand the forwarded NADF result 254 from the NADF adder 236 or the converted NADF operands 274. Flow proceeds to block 312.

At block 312, the NADF adder 236 adds the NADF operands 268 to generate the NADF result 254 for instruction-C. Flow ends at block 312, although it is understood that the forwarding of NADF results 252 and/or 254 may advantageously continue for a long sequence of instructions, thereby reducing latency and speeding up the execution of the sequence of instructions relative to the conventional floating point units 112 of FIG. 4 that include the ADF-to-NADF conversion and NADF-to-ADF conversion in the forwarding paths.

At block 322, the converter 228 converts the NADF result 252 of instruction-B to ADF result 162. Flow proceeds to decision block 324.

At decision block 324, the converter 228 determines whether the NADF result 252 of instruction-B creates an exception condition when converting to ADF. If so, flow proceeds to block 326; otherwise, flow proceeds to block 328.

At block 326, the converter 228 asserts the exception indicator 172 to the ROB 114. Consequently, the microprocessor 100 will take an exception, and the ROB 114 will flush instruction-C since instruction-C is newer in program sequence than instruction-B that caused the exception. This is necessary since the NADF result 252 of instruction-B was speculatively forwarded to the NADF adder 236 without knowledge of whether the NADF result 252 was a good operand, i.e., without knowledge of whether the NADF result 252 was a non-underflowed/overflowed value from an ADF perspective. That is, the programmer may not have desired instruction-C to execute with a non-good operand. However, advantageously the NADF results 252/254 are speculatively forwarded to potentially reduce the latency of instruction execution and in most cases both the forwarding and the receiving instructions will complete successfully. Flow ends at block 326.

At block 328, floating point unit 112A provides the ADF result 162 to the ROB 114 for storage in a temporary register therein. Flow proceeds to block 332.

At block 332, the ROB 114 retires the ADF result 162 from the temporary register to the appropriate GPR 118. Flow ends at block 332.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor having an instruction set architecture (ISA) that specifies at least one architected data format (ADF) for floating-point operands, the microprocessor comprising:
   a plurality of floating-point units, each comprising an arithmetic unit configured to receive non-ADF source operands and to perform a floating-point operation on the non-ADF source operands to generate a non-ADF result; and
   forwarding buses, configured to forward the non-ADF result generated by each arithmetic unit of the plurality of floating-point units to each of the plurality of floating-point units for selective use as one of the non-ADF source operands;
   wherein each of the floating-point units comprises:
      a mux configured to receive the non-ADF results and to select one or more of the non-ADF results for provision as the non-ADF source operands to the floating-point unit.

2. The microprocessor of claim 1, wherein the ISA is an x86 ISA.

3. The microprocessor of claim 1, wherein the non-ADF comprises a larger number of bits than the ADF for specifying a floating-point operand exponent.

4. The microprocessor of claim 1, wherein each of the floating-point units comprises:
   a converter configured to receive one or more ADF operands and to convert the one or more ADF operands to one or more corresponding non-ADF operands for provision to the mux, wherein the mux is further configured to select one or more of the non-ADF results and/or the converted non-ADF operands for provision as the non-ADF source operands to the floating-point unit.

5. The microprocessor of claim 1, wherein each of the floating-point units comprises:
   a converter configured to convert the non-ADF result generated by the floating-point unit to an ADF result, wherein the converter is further configured to generate an exception indication when the converter detects that converting the non-ADF result generated by the floating-point unit to the ADF result creates an exception condition.

6. The microprocessor of claim 5, wherein the exception condition comprises an underflow or overflow.

7. The microprocessor of claim 5, wherein the microprocessor is configured, in response to the converter generating the exception indication, to cancel any instruction to which the exception condition-creating ADF result is forwarded.

8. The microprocessor of claim 7, wherein the microprocessor is configured to retire the ADF result to an architected register of the microprocessor when the converter does not generate an exception indication.

9. The microprocessor of claim 1, wherein the non-ADF result is one of a product and a sum.

10. A method for processing floating-point instructions in a microprocessor having first and second floating-point units each having an arithmetic unit, wherein the microprocessor has an instruction set architecture (ISA) that specifies at least one architected data format (ADF) for floating-point operands, the method comprising:

performing, by the arithmetic unit of the first floating-point unit, a floating-point operation on first and second non-ADF source operands to generate a first non-ADF result;

performing, by the arithmetic unit of the second floating-point unit, a floating-point operation on third and fourth non-ADF source operands to generate a second non-ADF result;

forwarding, by the first floating-point unit, the first non-ADF result to the second floating-point unit;

forwarding, by the second floating-point unit, the second non-ADF result to the first floating-point unit;

performing, by the arithmetic unit of the first floating-point unit, a floating-point operation on the second non-ADF result and a fifth non-ADF operand to generate a third non-ADF result; and performing, by the arithmetic unit of the second floating-point unit, a floating-point operation on the first non-ADF result and a sixth non-ADF operand to generate a third non-ADF result;

wherein each of the floating-point units comprises:
a mux configured to receive the non-ADF results and to select one or more of the non-ADF results for provision as the non-ADF source operands to the floating-point unit.

11. The method of claim 10, wherein the ISA is an x86 ISA.

12. The method of claim 10, wherein the non-ADF comprises a larger number of bits than the ADF for specifying a floating-point operand exponent.

13. The method of claim 10, wherein each of the floating-point units comprises:
a converter configured to receive one or more ADF operands and to convert the one or more ADF operands to one or more corresponding non-ADF operands for provision to the mux, wherein the mux is further configured to select one or more of the non-ADF results and/or the converted non-ADF operands for provision as the non-ADF source operands to the floating-point unit.

14. The method of claim 10, wherein each of the floating-point units comprises:
a converter configured to convert the non-ADF result generated by the floating-point unit to an ADF result, wherein the converter is further configured to generate an exception indication when the converter detects that converting the non-ADF result generated by the floating-point unit to the ADF result creates an exception condition.

15. The method of claim 14, wherein the exception condition comprises an underflow or overflow.

16. The method of claim 14, wherein the microprocessor is configured, in response to the converter generating the exception indication, to cancel any instruction to which the exception condition-creating ADF result is forwarded.

17. The method of claim 16, wherein the microprocessor is configured to retire the ADF result to an architected register of the microprocessor when the converter does not generate an exception indication.

18. The method of claim 10, wherein the non-ADF result is one of a product and a sum.

19. A computer program product encoded in at least one non-transitory computer readable medium for use with a computing device, the computer program product comprising:

computer readable program code embodied in said medium, for specifying a microprocessor having an instruction set architecture (ISA) that specifies at least one architected data format (ADF) for floating-point operands, the computer readable program code comprising:

first program code for specifying a plurality of floating-point units, each comprising an arithmetic unit configured to receive non-ADF source operands and to perform a floating-point operation on the non-ADF source operands to generate a non-ADF result; and second program code for specifying forwarding buses, configured to forward the non-ADF result generated by each arithmetic unit of the plurality of floating-point units to each of the plurality of floating-point units for selective use as one of the non-ADF source operands;

wherein each of the floating-point units comprises:
a mux configured to receive the non-ADF results and to select one or more of the non-ADF results for provision as the non-ADF source operands to the floating-point unit.

20. The computer program product of claim 19, wherein the at least one non-transitory computer readable medium is selected from the set of a disk, tape, or other magnetic, optical, or electronic storage medium and a network, or wire line communications medium.

21. The computer program product of claim 19, wherein the ISA is an x86 ISA.

22. The computer program product of claim 19, wherein the non-ADF comprises a larger number of bits than the ADF for specifying a floating-point operand exponent.

* * * * *